United States Patent
Hara et al.

(10) Patent No.: US 8,440,294 B2
(45) Date of Patent: *May 14, 2013

(54) STRUCTURAL COLOR BODY

(75) Inventors: Shigeo Hara, Hamamatsu (JP);
Takahiko Yamanaka, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/534,451

(22) Filed: Jun. 27, 2012

(65) Prior Publication Data

US 2013/0004721 A1  Jan. 3, 2013

(30) Foreign Application Priority Data

Jun. 30, 2011  (JP) ................................. P2011-145583

(51) Int. Cl.
*B32B 3/00* (2006.01)
*B32B 3/26* (2006.01)
*C08F 287/00* (2006.01)

(52) U.S. Cl.
USPC ............. 428/221; 428/161; 428/54; 428/213; 428/320.2; 428/333; 428/339; 428/543; 428/542.2; 428/44; 428/1.1; 356/121; 356/600; 356/630; 356/402; 356/256; 356/445; 356/35; 356/601; 525/50

(58) Field of Classification Search ........................ None
See application file for complete search history.

(56) References Cited

FOREIGN PATENT DOCUMENTS

| JP | 2005-153192 | 6/2005 |
|---|---|---|
| JP | 2007-225935 | 9/2007 |
| JP | 4427026 | 3/2010 |
| WO | 2008/047514 | 4/2008 |

OTHER PUBLICATIONS

H. Wang et al., "Ordering Kinetics and Alignment of Block Copolymer Lamellae Under Shear Flow", Macromolecules, 1999, pp. 3695-3711, vol. 32.
Ian W. Hamley, "The effect of shear on ordered block copolymer solutions", Current Opinion in Colloid & Interface Science, 2000, pp. 342-350, vol. 5.
Yoshiaki Takahashi et al., Comparison between Flow-Induced Alignment Behaviors of Poly(styrene-*block*-2-vinylpyridine)s and Poly-(styrene-*block*-isoprene)s Solutions near ODT, Polymer Journal, 2005, pp. 900-905, vol. 37.
Shinya Yoshioka, "Comparative physiological biochemistry", 2008, pp. 86-95, vol. 25, No. 3 [Partial English translation].
Winey, Karen, I., et al., "Morphology of a Lamellar Diblock Copolymer Aligned Perpendicular to the Sample Plane: Transmission Electron Microscopy and Small-Angle X-ray Scattering," Macromolecules, vol. 26. No. 16. Apr. 27, 1993, p. 4373-4375.

(Continued)

*Primary Examiner* — David Sample
*Assistant Examiner* — Nicole T Gugliotta
(74) *Attorney, Agent, or Firm* — Drinker Biddle & Reath LLP

(57) ABSTRACT

A structural color body is film-like and formed of a resin layer containing a block copolymer, the resin layer has a microphase separated structure including lamellar micro domains, each of the micro domains has a wave-like shape having amplitudes in the thickness direction of the structural color body, and in each of the micro domains, a maximum value of distances in the direction between the tops of convexities and the bottoms of concavities is larger than the wavelength in the visible light range.

5 Claims, 8 Drawing Sheets

OTHER PUBLICATIONS

Vigild, M.E., et al., "Influence of Shear on the Alignment of a Larrellae-Forming Pentablock Copolymer," Macromolecules, vol. 34, No. 4, Jan. 20, 2001, p. 951-964.

Office Action dated Dec. 19, 2012 in U.S. Appl. No. 13/534,523 including Double Patenting rejections at pp. 2-4.

U.S. Office Action dated Mar. 14, 2013 that issued in U.S. Appl. No. 13/534,473 including Double Patenting Rejections on pp. 2-4.

Fig.1
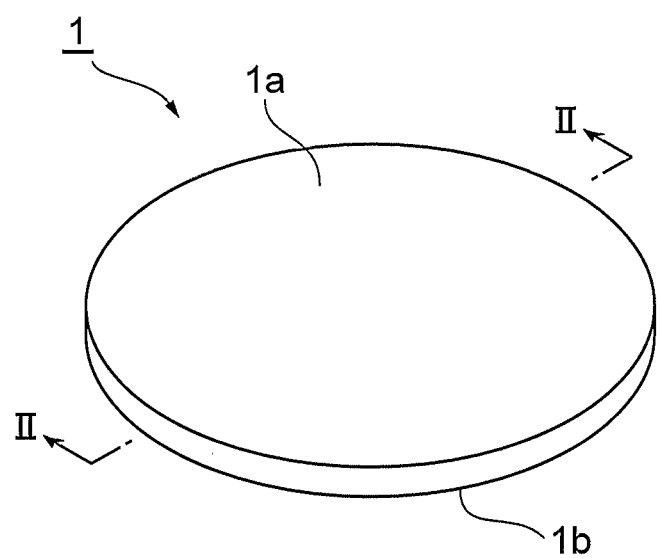
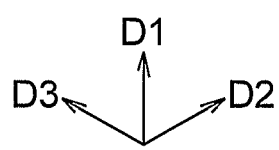

Fig.4
(a)
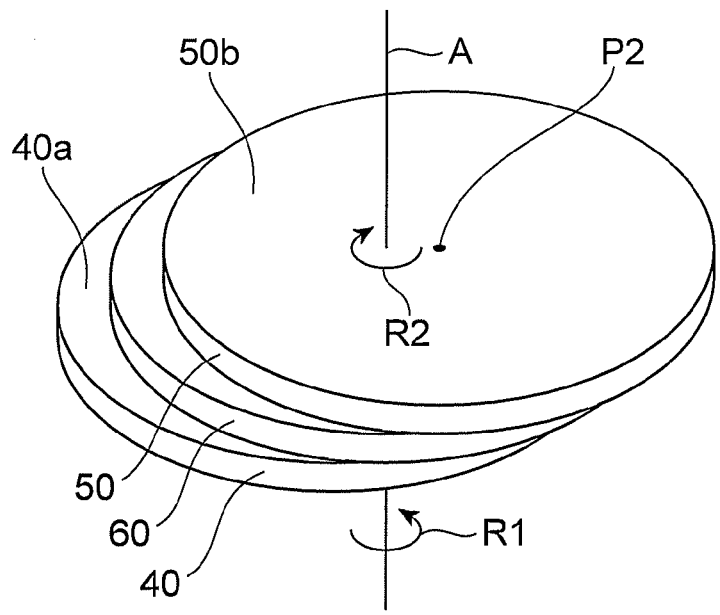
(b)
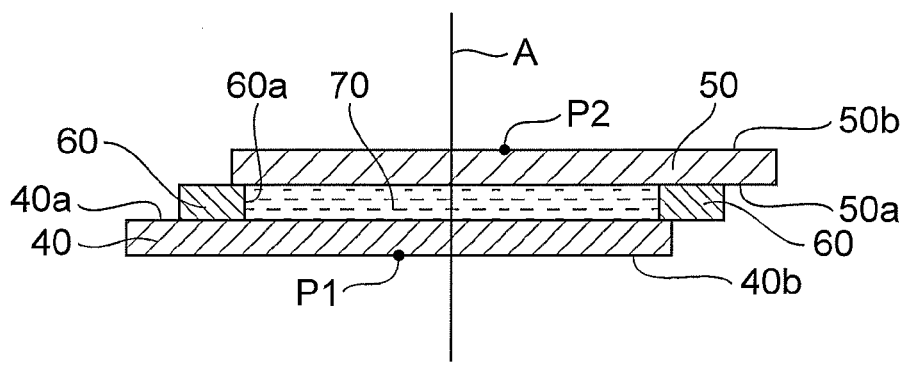

Fig.5
(a)
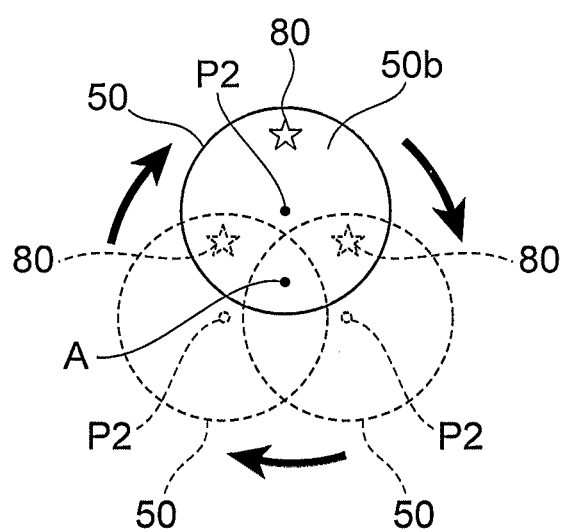
(b)
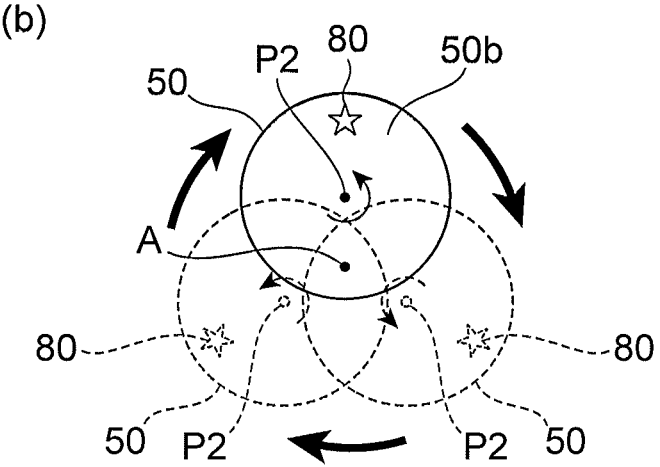

Fig.6
(a)
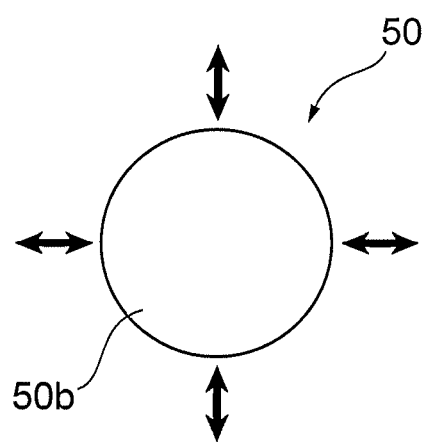
(b)
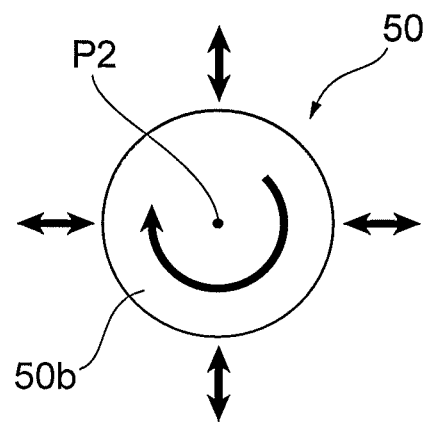

STRUCTURAL COLOR BODY

BACKGROUND OF THE INVENTION

1. Field of the Invention

The present invention relates to a structural color body, and particularly, to a film-like structural color body.

2. Related Background Art

A structural color body is a color body that develops structural colors, and causes phenomena such as reflection, interference, refraction, diffraction and scattering of light due to the microstructure of the color body to develop lights inherent to the microstructure. As a structural color body, a structural body (for example, refer to Patent Documents 1 to 3 listed below) obtained by laminating films with refractive indexes different from each other on a surface with concavities and convexities of a substrate, and a multilayer film (for example, refer to Non-Patent Document 1 listed below) having a curved shape have been proposed.

As a structural color material for forming the structural color body, a photonic crystal having a micro-phase separated structure formed by self-assembly of a block copolymer as a refractive index periodic structure is known (for example, refer to Patent Document 4 listed below). For orientation control of the micro-phase separated structure that influences the optical property of this photonic crystal, for example, methods in which shear flow fields are applied are proposed in Non-Patent Documents 2 to 4 listed below.

Patent Document 1: Japanese Patent Application Laid-Open No. 2007-225935

Patent Document 2: Japanese Patent Application Laid-Open No. 2005-153192

Patent Document 3: Japanese Examined Patent Application Publication No. 4427026

Patent Document 4: Pamphlet of International Publication No. 2008/047514

Non-Patent Document 1: Comparative Physiology and Biochemistry, Vol. 25, No. 3

Non-Patent Document 2: Polymer Journal Vol. 37, No. 12, 900-905 (2005)

Non-Patent Document 3: Macromolecules 32, 3695-3711 (1999)

Non-Patent Document 4: Current Opinion in Colloid & Interface Science 5, 342-350 (2000)

SUMMARY OF THE INVENTION

As described in Patent Document 4 listed above, in order to obtain a photonic crystal using a block copolymer with an excellent optical property, a micro-phase separated structure with high regularity and high orientation must be fabricated. For example, the optical property of a film-like photonic crystal having a lamellar micro-phase separated structure as a multilayer film filter improves as the orientation of the structure oriented parallel to the film principal surface becomes higher. On the other hand, the film-like photonic crystal can be utilized as a structural color body, however, when light in the visible light range is made incident on the principal surface of the structural color body having lamellar micro domains oriented parallel to the principal surface, an angle range in which structural colors are observable tends to become narrow.

The present invention was made to solve the above-described problem, and an object thereof is to provide a structural color body that can widen an angle range in which structural colors are observable.

A structural color body according to the present invention is a structural color body having a first principal surface and a second principal surface opposed to each other, wherein the structural color body is film-like and is composed of a resin layer containing a block copolymer, the resin layer has a micro-phase separated structure including lamellar micro domains, each of the micro domains has a wave-like shape having amplitudes in the thickness direction of the structural color body, and in each of the micro domains, a maximum value of distances in the thickness direction between the tops of convexities and the bottoms of concavities of the micro domain is larger than the wavelength in the visible light range.

On a principal surface of a structural color body having lamellar micro domains oriented parallel to the principal surface, the incident angle range that satisfies the Bragg reflection condition tends to become narrow, so that a structural color tends to become harder to observe when light in the visible light range is made incident on the principal surface from a direction inclined with respect to the thickness direction of the structural color body. On the other hand, in the structural color body according to the present invention, each of the micro domains has a wave-like shape having amplitudes in the thickness direction of the structural color body, and in each of the micro domains, a maximum value of distances in the thickness direction between the tops of convexities and the bottoms of concavities of the micro domain is larger than the wavelength in the visible light range. In this case, even when light in the visible light range is made incident on the principal surface of the structural color body from a direction inclined with respect to the thickness direction of the structural color body, a region perpendicular to an incident direction of light and a region inclined with respect to an incident direction of light to an extent to satisfy the Bragg reflection condition easily exist in the micro domains of the resin layer, so that light can be reflected at these regions. Therefore, in the structural color body, even when light in the visible light range is made incident on the principal surface of the structural color body from the direction inclined with respect to the thickness direction of the structural color body, light reflected at the resin layer can be observed as a structural color, so that an angle range in which structural colors are observable can be widened.

In the structural color body having lamellar micro domains oriented parallel to the principal surface, a structural color to be observed tends to differ between a case where the principal surface is observed from the thickness direction of the structural color body and a case where the principal surface is observed from a direction inclined with respect to the thickness direction of the structural color body. On the other hand, in the structural color body according to the present invention, in the case where the principal surface is observed from the thickness direction of the structural color body and in the case where the principal surface is observed from the direction inclined with respect to the thickness direction of the structural color body, a region perpendicular to the observation direction easily exists in the micro domains of the resin layer, so that the structural color can be uniformly observed regardless of the observation angle.

The thickness of the structural color body is preferably 100 to 1000 μm. In this case, it becomes easier to widen an angle range in which structural colors are observable.

A weight-average molecular weight of the block copolymer is preferably equal to or more than $8.0 \times 10^5$. In this case, a periodic structure necessary for a structural color body to exhibit chromogenic performance can be more satisfactorily obtained.

The resin layer preferably further contains a polymer compound obtained by polymerizing a composition containing at least one kind of photopolymerizable monomer selected from the group consisting of acrylates and methacrylates. In this case, a wave-like structure in which each of the micro domains of the resin layer has amplitudes in the thickness direction of the structural color body can be more satisfactorily obtained.

The resin layer may further contain at least one kind selected from the group consisting of phthalate ester, adipate ester, phosphate ester, trimellitate ester, citrate ester, epoxy compound and polyester.

According to the present invention, an angle range in which structural colors are observable (an inclined angle range with respect to the thickness direction of the structural color body) can be widened. In addition, according to the present invention, a structural color can be uniformly observed regardless of the observation angle. According to the present invention, when either the first principal surface or the second principal surface is observed, these effects can be obtained. Further, the structural color body according to the present invention can be easily fabricated without requiring a complicated step such as a vacuum semiconductor process.

BRIEF DESCRIPTION OF THE DRAWINGS

FIG. 1 is a perspective view showing a structural color body according to an embodiment of the present invention.

FIG. 4 is a view showing a step of a method for manufacturing the structural color body according to an embodiment of the present invention.

FIG. 5 is a view showing a step of a method for manufacturing the structural color body according to the embodiment of the present invention.

FIG. 6 is a view showing a step of a method for manufacturing the structural color body according to the embodiment of the present invention.

DESCRIPTION OF THE PREFERRED EMBODIMENTS

Hereinafter, embodiments of the present invention are described in detail with reference to the drawings.

(Structural Color Body)

Figure 2:
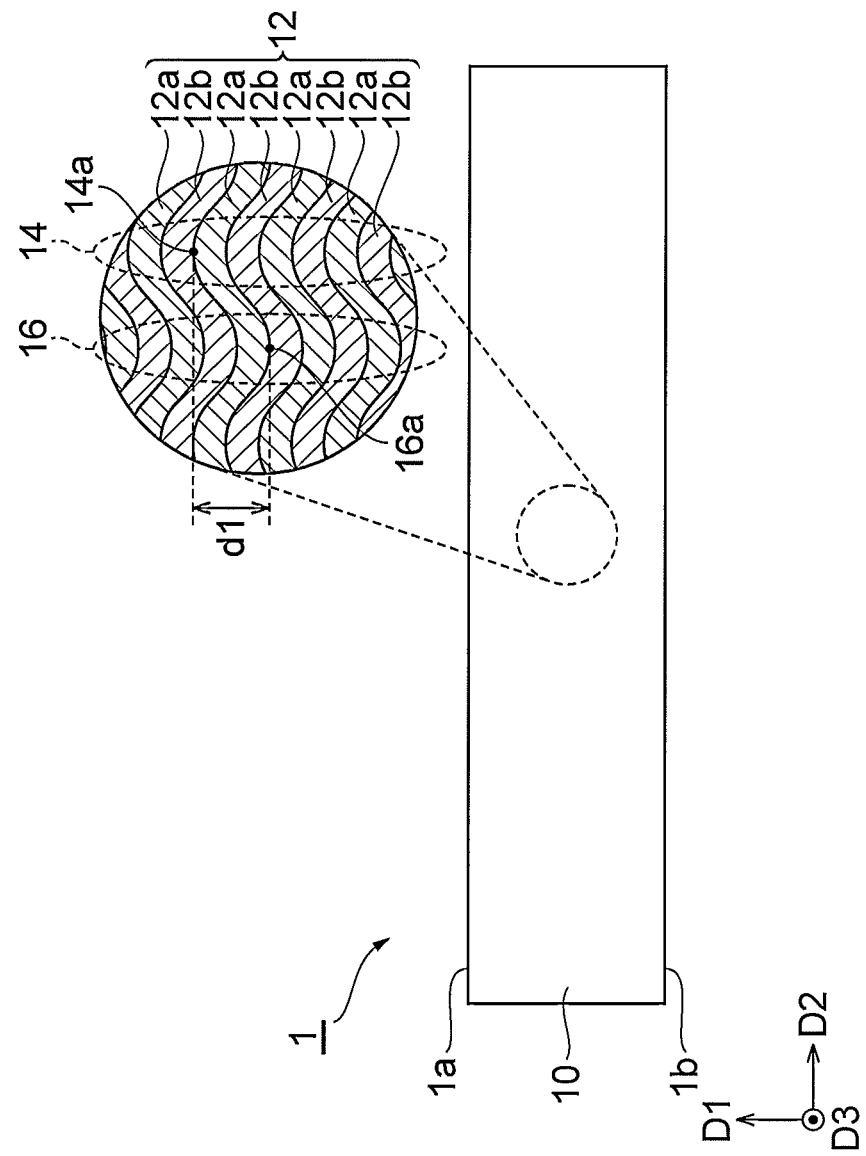
FIG. 2 is a schematic sectional view taken along line II-II in FIG. 1.

FIG. 1 is a perspective view showing a structural color body according to the present embodiment. FIG. 2 is a schematic sectional view taken along line II-II in FIG. 1. A structural color body 1 according to the present embodiment is film-like, and has a front surface (first principal surface) 1a and a back surface (second principal surface) 1b opposed substantially parallel to each other. The structural color body 1 is entirely composed of a resin layer 10, and the thickness of the structural color body 1 (thickness of the resin layer 10) is preferably 100 to 1000 μm, and more preferably 200 to 800 μm.

The resin layer 10 is made by a polymer photonic crystal. The polymer photonic crystal contains a block copolymer (polymer block copolymer). A "block copolymer" is a copolymer formed by bonding two or more kinds of polymer chains (segments) each other, and is, for example, a copolymer in which the ends of a first polymer chain whose structural unit is monomer A and a second polymer chain whose structural unit is monomer B are linked to each other.

The block copolymer is, for example, a binary block copolymer such as polystyrene-b-poly(methylmethacrylate), polystyrene-b-poly(ethylmethacrylate), polystyrene-b-poly(propylmethacrylate), polystyrene-b-poly(tert-butylmethacrylate), polystyrene-b-poly(n-butylmethacrylate), polystyrene-b-poly(isopropylmethacrylate), polystyrene-b-poly(pentylmethacrylate), polystyrene-b-poly(hexylmethacrylate), polystyrene-b-poly(decylmethacrylate), polystyrene-b-poly(dodecylmethacrylate), polystyrene-b-poly(methylacrylate), polystyrene-b-poly(tert-butylacrylate), polystyrene-b-polybutadiene, polystyrene-b-polyisoprene, polystyrene-b-polydimethylsiloxane, polybutadiene-b-polydimethylsiloxane, polyisoprene-b-polydimethylsiloxane, polyvinylpyridine-b-poly(methylmethacrylate), polyvinylpyridine-b-poly(tert-butylmethacrylate), polyvinylpyridine-b-polybutadiene, polyvinylpyridine-b-isoprene, polybutadiene-b-polyvinylnaphthalene, polyvinylnaphthalene-b-poly(methylmethacrylate), and polyvinylnaphthalene-b-poly(tert-butylmethacrylate); a ternary block copolymer such as polystyrene-b-polybutadiene-b-poly(methylmethacrylate), polystyrene-b-polybutadiene-b-poly(tert-butylmethacrylate), polystyrene-b-polyisoprene-b-poly(methylmethacrylate), polystyrene-b-polyisoprene-b-poly(tert-butylmethacrylate). The block copolymer is not limited to the above-described block copolymers as long as its refractive index differs between polymer chains. FIG. 2 shows a mode in which the resin layer 10 contains a binary block copolymer as a block copolymer by way of example.

The lower limit of the weight-average molecular weight (Mw) of the block copolymer is preferably equal to or more than $8.0 \times 10^5$ (g/mol), more preferably equal to or more than $9.0 \times 10^5$ (g/mol), and still more preferably equal to or more than $1.0 \times 10^6$ (g/mol) in order to satisfactorily obtain a periodic structure necessary for a structural color body to exhibit chromogenic performance. The upper limit of the weight-average molecular weight is preferably equal to or less than $3.0 \times 10^6$ (g/mol), more preferably equal to or less than $2.5 \times 10^6$ (g/mol), and still more preferably equal to or less than $2.0 \times 10^6$ (g/mol) in order to satisfactorily obtain a periodic structure necessary for a structural color body to exhibit chromogenic performance. The weight-average molecular weight can be obtained as a weight-average molecular weight in terms of polystyrene conversion by using gel permeation chromatography (GPC).

The resin layer 10 has micro-phase separated structures. The "micro-phase separated structure" is an assembly of a plurality of micro domains arranged periodically. The "micro domains" are phases formed by phase-separating different kinds of polymer chains of the block copolymer from each other without mixing.

The micro-phase separated structure of the resin layer 10 includes lamellar micro domains 12 consisting of micro domains 12a and micro domains 12b, and is a refractive index periodic structure formed by alternately laminating the micro domains 12a and the micro domains 12b. The micro domains 12a contain one polymer chain of the block copolymer as a major constituent, and the micro domains 12b contain the other polymer chain of the block copolymer as a major constituent.

Each of the micro domains 12 of the resin layer 10 has a wave-like shape (concavo-convex shape) having amplitudes in the thickness direction (the direction in which the front surface 1a and the back surface 1b are opposed to each other)

D1 of the structural color body 1. Each of the micro domains 12 includes convexities 14 convexed in the direction D1 and concavities 16 concaved in the direction D1 alternately along a direction substantially perpendicular to the direction D1.

The micro domains 12 have two-dimensional or one-dimensional alignment of concavities and convexities. For example, convexities and concavities in each micro domain may be arranged alternately along a direction D2 substantially perpendicular to the direction D1 and arranged alternately along a direction D3 substantially perpendicular to the direction D1 and the direction D2 (two-dimensional alignment of concavities and convexities), or may be arranged to be long in the direction D3 and alternately along the direction D2 (one-dimensional alignment of concavities and convexities). The wave axes of each micro domain are preferably substantially parallel to at least one of the front surface 1a or the back surface 1b. Each micro domain preferably has concavities and convexities isotropically curved in the direction D2 and the direction D3, and the persistence length of the concavities and convexities is preferably long in the direction D2 and the direction D3.

In each of the micro domains 12 (micro domains 12a and 12b) of the resin layer 10, a maximum value of the distances d1 in the direction D1 between the tops (for example, apexes) 14a of convexities 14 and the bottoms (for example, bottom points) 16a of concavities 16 of the micro domain 12 is larger than the wavelength λ1. Here, each micro domain 12 includes pluralities of tops 14a and bottoms 16a, respectively, and a maximum value of the distances d1 in one micro domain 12 indicates the largest value among distances in the direction D1 each of which is between a top 14a selected among the plurality of tops 14a and a bottom 16a selected among the plurality of bottoms 16a of the micro domain 12. The top 14a and the bottom 16a providing the maximum value of the distance d1 may be adjacent to each other or not adjacent to each other. In a cross-section obtained by cutting the structural color body 1 substantially parallel to the direction D1, when the micro domain 12 has at least one distance d1 larger than the wavelength λ1, the maximum value of the distances d1 in this micro domain 12 becomes larger than the wavelength λ1.

As a target wavelength of the structural color body 1, the wavelength λ1 is the wavelength in the visible light range (for example, 350 to 700 nm). For example, the maximum value of the distance d1 is larger than 350 nm. On a structural color body formed by alternately laminating micro domains with a high refractive index (refractive index n1, thickness t1) and micro domains with a low refractive index (refractive index n2 (n2<n1), thickness t2), when light is made incident from a direction perpendicular to the principal surface of this structural color body, light with the wavelength λ2 expressed by the following equation (1) is selectively intensified in this structural color body and easily observed as a structural color. The wavelength λ1 is more preferably the wavelength λ2.

$$\text{Wavelength } \lambda 2=2\times(n1\times t1+n2\times t2) \quad (1)$$

Figure 3:
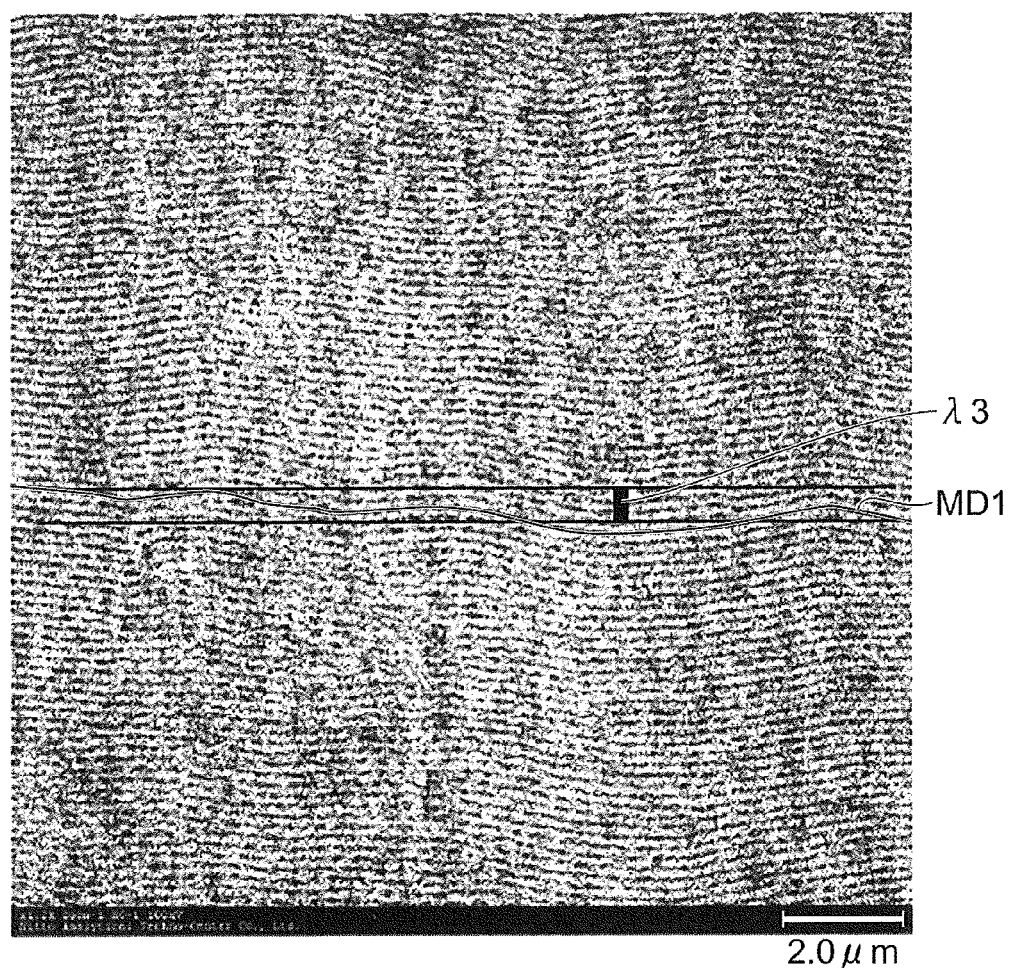
FIG. 3 is a view showing an example of a cross-section of the structural color body.

FIG. 3 is a view (TEM photograph) showing an example of a cross-section of the film-like structural color body 1. In the micro domain MD1, the distances d1 in the thickness direction of the structural color body 1 between the tops of convexities and the bottoms of concavities of the micro domain MD1 are larger than the wavelength (wavelength: 530 nm) λ3 in the visible light range.

The polymer photonic crystal which forms the resin layer 10 preferably further contain, as a constituent other than the block copolymer, a photocurable resin (polymer compound) obtained by photopolymerizing a composition containing a photopolymerizable monomer that can dissolve the block copolymer and a photopolymerization initiator described later as a monomeric component under the presence of the photopolymerization initiator. The photopolymerizable monomer is preferably at least one kind selected from the group consisting of acrylates and methacrylates. The photopolymerizable monomer may be either a monofunctional monomer or a polyfunctional monomer, and is, for example, a monofunctional monomer such as carboxyethylacrylate, isobornyl acrylate, octylacrylate, laurylacrylate, stearylacrylate, nonylphenoxy polyethylene glycol acrylate, dicyclopentenylacrylate, dicyclopentenyloxyethylacrylate, dicyclopentanylacrylate, benzylacrylate, phenoxyethylacrylate, dicyclopentenyloxyethylmethacrylate, dicyclopentanylmethacrylate, benzylmethacrylate, octylmethacrylate and 2-ethyl hexyl-diglycol acrylate; a polyfunctional monomer such as diethyleneglycol acrylate, 1,4-butanediol diacrylate, 1,6-hexanediol acrylate, 1,9-nonanediol diacrylate, polypropyleneglycol diacrylate, EO modified bisphenol A diacrylate, dicyclopentanyldiacrylate, neopentylglycol-modified trimethylolpropanediacrylate, 4,4'-diacryloyloxy stilbene, diethyleneglycol methacrylate, 1,4-butanediol dimethacrylate, 1,6-hexanediol methacrylate, 1,9-nonanediol dimethacrylate, dicyclopentanyl dimethacrylate, neopentylglycol dimethacrylate, EO modified bisphenol A dimethacrylate, tris(2-acryloyloxyethyl)isocyanurate and caprolactone modified dipentaerythritol hexaacrylate. The photopolymerizable monomer is preferably a polyfunctional monomer, and is more preferably dicyclopentanylacrylate, neopentylglycol modified trimethylolpropane diacrylate, 1,4-butanediol diacrylate, 1,6-hexanediol acrylate, 1,9-nonanediol diacrylate, or caprolactone modified dipentaerythritol hexaacrylate. A single photopolymerizable monomer may be used, or two or more kinds may be mixed and used. The content of the photocurable resin is preferably 40 to 90% by mass with reference to the total mass of the structural color body 1.

The polymer photonic crystal which forms the resin layer 10 may contain other constituents such as a plasticizer. The plasticizer is, for example, at least one kind selected from the group consisting of phthalate ester such as dioctyl phthalate, adipate ester, phosphate ester, trimellitate ester, citrate ester, epoxy compound, and polyester. By containing these plasticizers in the structural color body 1, the regularity of the micro-phase separated structure can be improved. The content of the plasticizers is preferably 5 to 50% by mass with reference to the total mass of the structural color body 1.

(Method for Manufacturing Structural Color Body)

A method for manufacturing the structural color body 1 according to the present embodiment comprises, for example, a flow field applying step (first step) in which shear flow fields are applied to a solution containing a block copolymer, a photopolymerization initiator and a photopolymerizable monomer capable of dissolving the block copolymer and the photopolymerization initiator by moving a first member and a second member relative to the solution in directions different from each other substantially parallel to at least one of the principal surface of the first member or the principal surface of the second member opposed to each other in a state where the solution is interposed between the principal surface of the first member and the principal surface of the second member, and a photopolymerizing step (second step) in which a structural color body having a micro-phase separated structure including lamellar micro domains is obtained by polymerizing the photopolymerizable monomer by irradiating the solution with light after the flow field applying step. The above-described manufacturing method may further comprise a solution preparing step before the flow field applying step.

The above-described manufacturing method may further comprise an annealing step between the flow field applying step and the photopolymerizing step.

In the solution preparing step, first, the block copolymer having the above-described polymer chains is polymerized. A method for polymerizing the block copolymer capable of forming lamellar micro domains is, for example, living anion polymerization, etc.

Next, by dissolving the block copolymer and the photopolymerization initiator in the photopolymerizable monomer capable of dissolving the block copolymer and the photopolymerization initiator, a polymer solution containing the block copolymer, the photopolymerization initiator and the photopolymerizable monomer is prepared. The polymer solution may contain other constituents such as the above-described plasticizers. In this stage of preparation of the above-described polymer solution, the block copolymer may form a micro-phase separated structure whose orientation is not controlled.

The content of the block copolymer in the polymer solution is preferably 3 to 30% by mass, more preferably 5 to 20% by mass, and still more preferably 7 to 15% by mass with reference to the total mass of the polymer solution to obtain a polymer solution that does not need to be heated for reducing the viscosity in the fabrication process and is low in viscosity to some extent and has fluidity at a room temperature. If the content of the block copolymer is less than 3% by mass, segregation power when forming the micro-phase separated structure tends to decrease, and the regularity of the micro-phase separated structure tends to deteriorate. If the content of the block copolymer is more than 30% by mass, although the segregation power increases, the viscosity increases and the orientation control by flow field application tends to become difficult.

The photopolymerization initiator is a polymerization initiator that can be activated by activated light irradiation. As the photopolymerization initiator, a radical photopolymerization initiator that increases the molecular weight (crosslinking) of a material to promote gelatinization by causing molecules to cleave according to activated light irradiation and become radical and by causing a radical polymerization reaction with a photopolymerizable polymer or monomer can be used. Examples of the photopolymerization initiator include benzyldimethylketal, α-hydroxyalkylphenone, α-aminoalkylphenone and the like. In detail, as the photopolymerization initiator, IRGACURE 651 (made by Ciba Specialty Chemicals) etc., can be used. These photopolymerization initiators may be used alone, or two or more kinds may be mixed and used. The content of the photopolymerization initiator is preferably 0.05 to 0.5% by mass with reference to the total mass of the photopolymerizable monomer.

Next, the flow field applying step is described with reference to FIG. 4. First, a plate-shaped member (first member) 40 having flat principal surfaces 40a and 40b opposed substantially parallel to each other and a plate-shaped member (second member) 50 having flat principal surfaces 50a and 50b opposed substantially parallel to each other are prepared. The plate-shaped members 40 and 50 are circular, for example. The plate-shaped members 40 and 50 are made of quartz glass, for example. The diameters of the plate-shaped members 40 and 50 are preferably 20 to 500 mm. The thicknesses of the plate-shaped members 40 and 50 are preferably 0.5 to 10 mm. The shapes, constituent materials and sizes of the plate-shaped members 40 and 50 may be the same as each other or different from each other.

Subsequently, an annular (ring-shaped) spacer 60 having a circular opening 60a is disposed on the principal surface 40a of the plate-shaped member 40. The spacer 60 is preferably disposed so that the center of the opening 60a opposes the center of the principal surface 40a. The outer diameter of the spacer 60 is, for example, 20 to 500 mm, and the thickness of the spacer 60 is adjusted according to the thickness of a film to be fabricated.

Next, after a polymer solution 70 is developed inside the opening 60a, the plate-shaped member 50 is disposed on the polymer solution 70 so that the center point P1 of the principal surface 40b and the center point P2 of the principal surface 50b do not oppose each other in the thickness direction of the polymer solution 70, and the principal surface 40a and the principal surface 50a oppose substantially parallel to each other. Accordingly, the polymer solution 70 is held between the plate-shaped member 40 and the plate-shaped member 50 while being in contact with the principal surface 40a and the principal surface 50a. It is also possible that after the plate-shaped member 40 and the plate-shaped member 50 are disposed to oppose each other so that the principal surface 40a and the principal surface 50a become substantially parallel to each other, the polymer solution 70 is injected between the principal surface 40a and the principal surface 50a.

The thickness of the polymer solution 70 is preferably equal to or more than 100 μm, and more preferably equal to or more than 200 μm in order to satisfactorily obtain a periodic structure necessary for the structural color body to exhibit chromogenic performance. The thickness of the polymer solution 70 is preferably equal to or less than 1000 μm, and more preferably equal to or less than 800 μm in order to satisfactorily obtain a periodic structure necessary for the structural color body to exhibit chromogenic performance.

Subsequently, in a state where the polymer solution 70 is interposed between the principal surface 40a and the principal surface 50a, shear flow fields are applied to the polymer solution 70. In detail, by moving the plate-shaped member 40 or the plate-shaped member 50 relative to the polymer solution 70 in directions different from each other so as to move in a plurality of directions substantially parallel to at least one of the principal surface 40a or the principal surface 50a, shear flow fields are applied to the polymer solution 70. For example, as shown in FIG. 4, around a reference axis A that does not pass through the center point P1 of the principal surface 40b and the center point P2 of the principal surface 50b and is substantially perpendicular to the principal surface 40b and 50b, the plate-shaped member 40 is turned (revolved) in a direction R1 and the plate-shaped member 50 is turned (revolved) in a direction R2 opposite to the direction R1, substantially parallel to the principal surfaces 40a and 50a. The plate-shaped member 40 and the plate-shaped member 50 are preferably turned at the same rotating speed in directions opposite to each other.

In the flow field applying step, by applying shear flow fields in directions substantially perpendicular to the thickness direction of the polymer solution 70 (directions substantially parallel to the principal surfaces 40a and 50a) and shear flow fields in the thickness direction of the polymer solution 70 to the polymer solution 70, micro domains having wave-like shapes having amplitudes in the thickness direction of the polymer solution 70 are formed in the polymer solution 70.

The flow fields applied to the outer layer portions of the polymer solution 70 propagate in the thickness direction of the polymer solution 70 from the outer layer portions to the center portion of the polymer solution 70. In this case, depending on the magnitudes of the flow fields applied to the outer layer portions, the magnitudes of the flow fields propagating in the thickness direction of the polymer solution 70 attenuate with increasing distance from the outer layer portions of the polymer solution 70. In this case, the magnitude of the flow field applied to the outer layer portion of the polymer solution 70 and the magnitude of the flow field applied to the center portion of the polymer solution 70 are different from each other. In the present embodiment, adjustment is performed so that a certain level or more flow fields are applied to the entire polymer solution 70. Specifically, in the flow field applying step, by adjusting the application directions and the magnitudes of the shear flow fields, a resin layer 10 in which a maximum value of distances in the thickness direction of the polymer solution 70 between the tops of convexities and the bottoms of concavities of the micro domains is larger than the wavelength in the visible light range is formed in the entire polymer solution 70.

The method for obtaining the structural color body 1 by applying shear flow fields to the polymer solution 70 is not limited to the above-described method, and the methods shown in FIG. 5 and FIG. 6 can also be used. FIG. 5 illustrates a method in which steady motion of the plate-shaped member 50 within a plane substantially parallel to the principal surface 50a is caused. Here, "steady motion" is a motion made by repeating a predetermined motion at a fixed speed, and is, for example, a turning motion or planetary motion. FIG. 6 illustrates a method in which oscillatory motion of the plate-shaped member 50 within a plane substantially parallel to the principal surface 50a is caused. In FIG. 5 and FIG. 6, for the sake of convenience, members other than the plate-shaped member 50 are not illustrated. The reference numeral 80 in FIG. 5 is described for clearly showing whether the rotative motion of the plate-shaped member 50 is caused, and is not indicated in actuality.

As a method for obtaining the structural color body 1 by applying shear flow fields to the polymer solution 70, the following methods (a) to (d) can be used.

(a) "Turning motion": A method in which the plate-shaped member 50 is caused to turn around the reference axis A that does not pass through the center point P2 of the principal surface 50b and is substantially perpendicular to the principal surface 50b (FIG. 4 and FIG. 5(a)).

(b) "Planetary motion": A method in which the plate-shaped member 50 is caused to turn around the reference axis A while the plate-shaped member 50 is caused to rotate on an axis passing through the center point P2 of the principal surface 50b (FIG. 5(b)).

(c) "Oscillatory motion (reciprocating motion) in a plurality of directions without rotative motion (spinning)": A method in which the plate-shaped member 50 is caused to oscillate in one direction, and then caused to oscillate in another direction (FIG. 6(a)).

(d) "Oscillatory motion with rotative motion (spinning)": A method in which the plate-shaped member 50 is caused to oscillate in at least a uniaxial direction while the plate-shaped member 50 is caused to rotate on an axis passing through the center point P2 of the principal surface 50b (FIG. 6(b)).

In the flow field applying step, shear flow fields may be simultaneously applied in the plurality of directions to the polymer solution, or shear flow fields may be applied in a plurality of directions in multiple stages to the polymer solution. As the method for simultaneously applying shear flow fields in a plurality of directions, the above-described method (a), (b) or (d) can be used. As the method for applying shear flow fields in a plurality of directions in multiple stages, the above-described method (c) can be used. The two-dimensional alignment of concavities and convexities is easily obtained by the above-described methods (a) and (b), and the one-dimensional alignment of concavities and convexities is easily obtained by the above-described methods (c) and (d).

In the flow field applying step, it is preferable that flow fields are applied from the respective plate-shaped members 40 and 50 to the polymer solution 70 in directions opposite to each other by moving the plate-shaped members 40 and 50 so that the motion directions of these become opposite to each other. The motion methods and motion conditions of the plate-shaped members 40 and 50 are preferably substantially the same as each other except for the motion directions because the magnitudes of the shear flow fields applied from the respective plate-shaped members 40 and 50 to the polymer solution 70 become substantially the same as each other and the shapes of micro domains can be easily adjusted.

In FIG. 5(a) and FIG. 5(b), a reference point is selected in the principal surface 50b and the plate-shaped member 50 is turned around a reference axis that passes through the reference point and is substantially perpendicular to the principal surface 50b, however, the plate-shaped member 50 may be turned around a reference axis positioned outside the plate-shaped member 50. In FIG. 5(b), the rotating direction of the rotative motion and the turning direction of the turning motion are preferably opposite to each other.

In FIG. 6(a) and FIG. 6(b), the plate-shaped member 40 and the plate-shaped member 50 are preferably oscillated in simple harmonic motions at frequencies the same as each other in directions opposite to each other. In FIG. 6(b), the plate-shaped member 40 and the plate-shaped member 50 are preferably rotated at rotating speeds the same as each other in directions opposite to each other, and for example, the plate-shaped member 40 is rotated on an axis that passes through the center point P1 of the principal surface 40b in one direction, and the plate-shaped member 50 is rotated on an axis passing through the center point P2 of the principal surface 50b in a direction opposite to the rotating direction of the plate-shaped member 40.

The magnitudes of the shear flow fields to be applied to the polymer solution 70 can be appropriately adjusted by the motion speeds and the motion times of the plate-shaped members 40 and 50. The motion methods and motion conditions of the plate-shaped members 40 and 50 are appropriately selected according to the thickness of the polymer solution 70, and in the case where the thickness of the polymer solution 70 is 100 to 1000 μm, the motion methods and motion conditions are preferably adjusted as follows. The number of rotations in the turning motion is preferably 200 to 300 rpm. The frequency in the oscillatory motion is preferably 15 to 20 $s^{-1}$. The number of rotations in the rotative motion is preferably 100 to 150 rpm. The temperature of the polymer solution 70 is preferably 20 to 30° C., and the flow field application time is preferably 3 to 10 minutes.

In the annealing step, by annealing the polymer solution having the micro-phase separated structure, the regularity of the micro-phase separated structure is improved. The annealing temperature is preferably 15 to 100° C.

In the photopolymerizing step, the photopolymerizable monomer in the polymer solution is polymerized by irradiating the polymer solution with activated light (for example, ultraviolet ray). Accordingly, the micro-phase separated structure can be fixed by a simple method while the micro-phase separated structure formed in the flow field applying step is held. Through the above-described steps, the structural color body 1 can be obtained.

Figure 7:
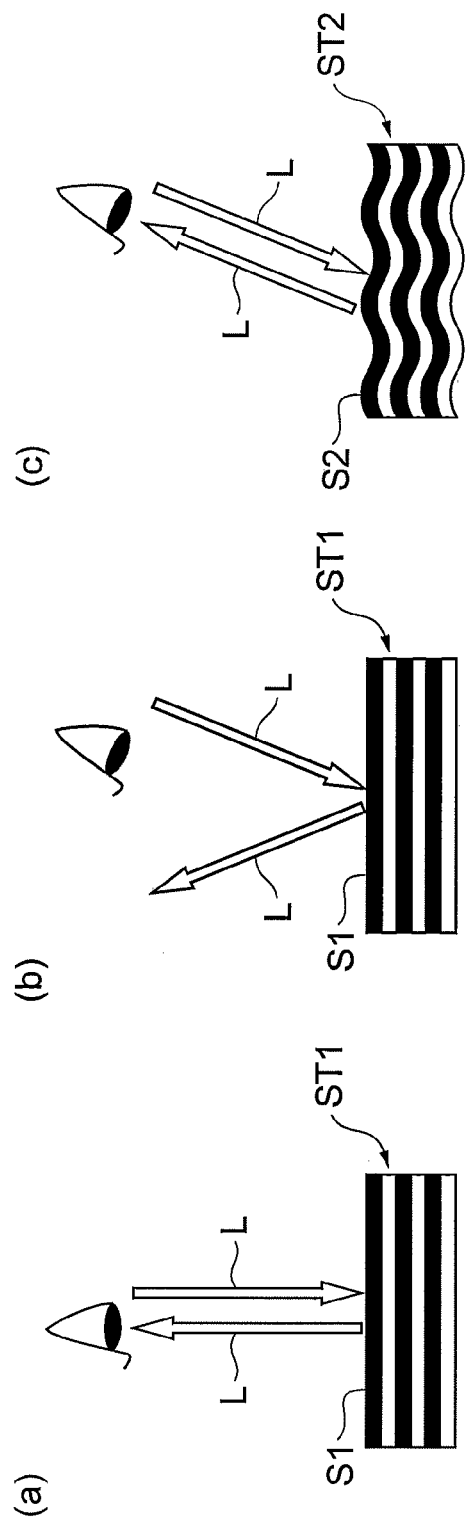
FIG. 7 is a view for describing visibilities of structural colors.

FIG. 7 is a view for describing the visibilities of structural colors, and is a view for describing the visibilities of structural colors when light is irradiated on a structural color body including lamellar micro domains. In FIG. 7(a) and FIG. 7(b), each of the micro domains of the structural color body ST1 has a tabular shape oriented parallel to the principal surface of the structural color body ST1. In FIG. 7(c), each of the micro domains of the structural color body ST2 has a wave-like shape having large amplitudes in the thickness direction of the structural color body ST2 (for example, each of the micro domains has a wave-like shape whose maximum value of distances in the thickness direction of the structural color body ST2 between the tops of convexities and the bottoms of concavities is larger than the wavelength in the visible light range).

In FIG. 7(a), light L irradiated onto the principal surface S1 from the thickness direction of the structural color body ST1 is reflected in a direction opposite to the incident direction of the light L at the micro domains of the structural color body ST1. In FIG. 7(a), the principal surface S1 is observed from the thickness direction of the structural color body ST1, and the light L reflected at the micro domains of the structural color body ST1 is observed.

In FIG. 7(b), light L irradiated onto the principal surface S1 from a direction crossing the thickness direction of the structural color body ST1 is reflected in another direction crossing the thickness direction of the structural color body ST1 at the micro domains of the structural color body ST1. In FIG. 7(b), the principal surface Si is observed from the incident direction of the light L, and light L reflected at the micro domains of the structural color body ST1 is not observed.

In FIG. 7(c), light L irradiated onto the principal surface S2 from a direction crossing the thickness direction of the structural color body ST2 is reflected in a direction opposite to the incident direction of the light L at the wave-like micro domains of the structural color body ST2. In FIG. 7(c), the principal surface S2 is observed from the incident direction of the light L, and light L reflected at the micro domains of the structural color body ST2 is observed.

Specifically, when a structural color body includes wave-like micro domains having large amplitudes, even when light in the visible light range is made incident on the principal surface of the structural color body from a direction inclined with respect to the thickness direction of the structural color body, a structural color can be observed, so that an angle range in which structural colors are observable is sufficiently widened. On the other hand, when each of the micro domains has a tabular shape oriented parallel to the principal surface of the structural color body, or when the amplitudes of the wave-like micro domains are small (for example, distances in the thickness direction of the structural color body between the tops of convexities and the bottoms of concavities of the wave-like micro domains are equal to or less than the wavelength in the visible light range), light in the visible light range that is made incident from a direction inclined with respect to the thickness direction of the structural color body does not tend to be sufficiently reflected.

In the structural color body 1, the respective micro domains 12 have wave-like shapes having amplitudes in the thickness direction D1 of the structural color body 1, and in each of the micro domains 12, a maximum value of distances d1 in the direction D1 between the tops 14a of convexities 14 and the bottoms 16a of concavities 16 is larger than the wavelength in the visible light range. In this case, even when light in the visible light range is made incident on the front surface 1a or the back surface 1b from a direction inclined with respect to the thickness direction D1 of the structural color body 1, a region perpendicular to an incident direction of light and a region inclined with respect to an incident direction of light to an extent to satisfy the Bragg reflection condition easily exist in the micro domains 12 of the resin layer 10, so that light can be reflected at these regions. Therefore, in the structural color body 1, even when light in the visible light range is made incident on the front surface 1a or the back surface 1b from the direction inclined with respect to the direction D1, light reflected at the resin layer 10 can be observed as a structural color, so that an angle range in which structural colors are observable can be widened.

In the structural color body 1, in the case where the front surface 1a or the back surface 1b is observed from the direction D1 and in the case where the front surface 1a or the back surface 1b is observed from the direction inclined with respect to the direction D1, a region perpendicular to the observation direction easily exists in the micro domains 12 of the resin layer 10, so that a structural color can be uniformly observed regardless of the observation angle.

The present invention is not limited to the above-described embodiment, and various modifications are possible. For example, the structural color body 1, the plate-shaped members 40 and 50, and the opening 60a of the spacer 60 are not limited to being circular, and may be, for example, rectangular.

Further, in the above-described embodiment, two plate-shaped members 40 and 50 opposing each other are used, however, three or more plate-shaped members may be used to apply shear flow fields to the polymer solution 70. For example, it is possible that two plate-shaped members are disposed on the polymer solution, and these plate-shaped members are moved to apply shear flow fields to the polymer solution 70.

EXAMPLES

Hereinafter, the present invention is described in detail with examples, however, the present invention is not limited to these.

<Fabrication of Film>

Example 1

First, as a block copolymer, polystyrene-b-poly(tert-butyl-methacrylate) (PS-b-P(t-BuMA)) (weight-average molecular weight: $1.0 \times 10^6$ [g/mol], PS : P(t-BuMA)=38:62 [vol %]) was synthesized by living anion polymerization under vacuum. Next, a mixture was obtained by dissolving the above-described polymer block copolymer in a mixed solvent containing 1,4-butanediol diacrylate and 2-ethyl hexyl-dig-lycol acrylate that were photopolymerizable monomers at a mass ratio of 30:70 so that the content of the polymer block copolymer becomes 10.0% by mass with reference to the total mass of the mixture. Further, a polymer solution was obtained by adding IRGACURE 651 (made by Ciba Specialty Chemicals) as a photopolymerization initiator to the mixture so that the content thereof becomes 0.3% by mass with reference to the total mass of the mixed solvent. It was confirmed that a micro-phase separated structure including lamellar micro domains was formed in the obtained polymer solution.

After a ring-shaped spacer with a thickness of 0.25 mm and an opening inner diameter of 80 mm was disposed on a principal surface of a circular quartz glass plate (diameter: 10 cm, thickness: 3 mm), the polymer solution was dripped into the opening of the spacer. Subsequently, a circular quartz glass plate similar to that described above was disposed on the spacer so that the polymer solution was sandwiched vertically by the quartz glass plates, and developed in a circular film-like shape.

Next, by moving each of the two quartz glass plates sandwiching the polymer solution in different directions within a plane parallel to the principal surfaces of the quartz glass plates, shear flow fields were applied to the polymer solution (room temperature: 25° C.), and accordingly, a micro-phase separated structure including wave-like micro domains was obtained. The two quartz glass plates were moved relative to the polymer solution by means of turning motions (the above-described method (a)) in directions opposite to each other. The number of rotations in the turning motions was 200 rpm, and the flow field application time was 5 minutes.

After the shear flow field application, to improve the regularity of the micro-phase separated structure, annealing was applied for 10 minutes at room temperature while preventing extra flow fields from being applied. Thereafter, the polymer solution was cured by irradiating with ultraviolet rays (1820 μW/cm$^2$) for 5 minutes. Accordingly, a structural color film having a micro-phase separated structure including lamellar micro domains was obtained. In the structural color film, each of the micro domains had a wave-like shape having amplitudes in the thickness direction of the structural color film, and wave axes of the wave-like micro domains were oriented substantially parallel to the principal surface of the structural color film. It was confirmed that in each of the micro domains, a maximum value of distances in the thickness direction of the structural color film between the tops of convexities and the bottoms of concavities of the micro domain was larger than the wavelength in the visible light range. The thickness of the structural color film was 0.23 mm.

Comparative Example 1

A film was fabricated by the same method as in Example 1 except that the number of rotations in the turning motions was changed to 30 rpm. A film having a micro-phase separated structure including lamellar micro domains that are tabular and oriented parallel to each other was obtained. The thickness of the film was 0.23 mm.

<Reflection Characteristics Evaluation>

Figure 8:
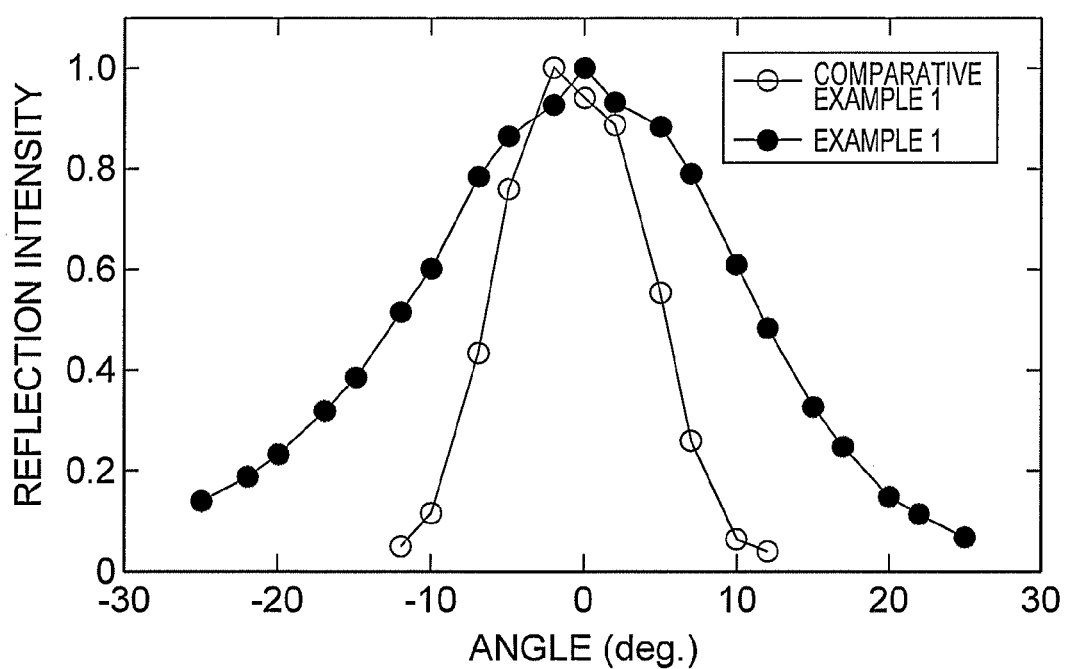
FIG. 8 is a diagram showing angle dependence of reflection intensity.

Angle dependences of reflection intensities of one principal surface of the films of Example 1 and Comparative example 1 were measured. The reflection intensities were measured with a reflection spectrometer while the films were angle-scanned. The measurement results of the angle dependences of the reflection intensities are shown in FIG. 8. An angle on the horizontal axis of the graph in FIG. 8 indicates an inclination angle from the film thickness direction. In Example 1, reflection of the same color was confirmed in a wide angle range. In Comparative example 1, it was confirmed that an angle range in which reflection of the same color was confirmed was narrow.

What is claimed is:

1. A structural color body having a first principal surface and a second principal surface opposed to each other, wherein
    the structural color body is film-like and is composed of a resin layer containing a block copolymer,
    the resin layer has a micro-phase separated structure including lamellar micro domains,
    each of the micro domains has a wave-like shape having amplitudes in a thickness direction of the structural color body, and
    in each of the micro domains, a maximum value of distances in the thickness direction between tops of convexities and bottoms of concavities of the micro domain is larger than a wavelength in a visible light range.

2. The structural color body according to claim 1, wherein a thickness of the structural color body is 100 to 1000 μm.

3. The structural color body according to claim 1, wherein a weight-average molecular weight of the block copolymer is equal to or more than $8.0 \times 10^5$.

4. The structural color body according to claim 1, wherein the resin layer further contains a polymer compound obtained by polymerizing a composition containing at least one kind of photopolymerizable monomer selected from the group consisting of acrylates and methacrylates.

5. The structural color body according to claim 1, wherein the resin layer further contains at least one kind selected from the group consisting of phthalate ester, adipate ester, phosphate ester, trimellitate ester, citrate ester, epoxy compound and polyester.

* * * * *